(12) United States Patent
Xu et al.

(10) Patent No.: US 6,239,575 B1
(45) Date of Patent: May 29, 2001

(54) INDUCTION MOTOR POWER/TORQUE CLAMPING FOR ELECTRIC VEHICLE PERFORMANCE

(75) Inventors: Jack H. Xu, Plochingen (DE); Kenneth James Farkas, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/502,869

(22) Filed: Feb. 11, 2000

(51) Int. Cl.[7] ..................................................... H02P 5/34
(52) U.S. Cl. .......................... 318/801; 318/798; 318/609; 318/610; 318/611; 318/599
(58) Field of Search ................................. 318/801, 798, 318/609, 610, 611, 599

(56) References Cited

U.S. PATENT DOCUMENTS

| | | |
|---|---|---|
| 4,999,557 * | 3/1991 | Inoue ................................ 318/609 |
| 5,168,204 | 12/1992 | Schauder . |
| 5,481,168 | 1/1996 | Mutoh et al. . |
| 5,583,406 | 12/1996 | Mutoh et al. . |
| 5,600,215 | 2/1997 | Yamada et al. . |
| 5,736,825 * | 4/1998 | Kaura et al. ..................... 318/599 |
| 5,739,664 | 4/1998 | Deng et al. . |

* cited by examiner

*Primary Examiner*—Karen Masih
(74) *Attorney, Agent, or Firm*—Karl Vick

(57) ABSTRACT

An induction motor control system (10) for electric vehicles having a DC power supply (12), an inverter (14), an induction motor (16), and a clamping unit (26). The clamping unit (26) applies a clamping value iq_clamp to a real torque current command $i_q{*}$. The clamping value iq_clamp is calculated in a maximum torque current calculation unit 28 and is based on predetermined maximum settings for the motor power $P_{max}$ and torque $T_{max}$. The clamping value iq_clamp is applied such that the torque current command $i_q{*}$ cannot exceed the clamping value iq_clamp, whereby the induction motor produces 16 output power $P_{out}$ and torque $T_{out}$ that is always less than the predetermined maximum settings, $P_{max}$ and $T_{max}$.

5 Claims, 1 Drawing Sheet

INDUCTION MOTOR POWER/TORQUE CLAMPING FOR ELECTRIC VEHICLE PERFORMANCE

TECHNICAL FIELD

The present invention relates generally to An electric vehicle, and in particular to a method and apparatus for protecting an electric vehicle from overperformance.

BACKGROUND OF THE INVENTION

An electric vehicle includes an electric traction battery which provides electric power for an electric traction motor, or an induction motor, which in turn drives the wheels of the electric vehicle. The traction battery is often made up of a plurality of modules connected in series. The modules are typically one or more interconnected battery cells.

Induction motor controls are used for electric vehicles including an AC induction motor, an electronic power inverter, and a micro-processor based controller. The inverter generally includes six switching transistors whose on/off stage will convert a DC current provided by a power supply, such as a DC battery, into an AC current required by the induction motor. The maximum voltage available to the motor is limited by the battery voltage and the maximum current available to the motor is limited by the current carrying capability of the switching devices.

Typically, an induction motor drive provides three stages of operation. At low speeds, the voltage required by the motor is lower than the voltage capability of the inverter. The output torque is limited by the current capability of the inverter, which is independent of the speed. Accordingly, the first stage of operation below a base speed is often called the constant torque stage of operation. At a medium speed range, above the base speed, the maximum torque can only be achieved when the motor is operated at both voltage and current limits. In this stage, the maximum output torque is inversely proportional to the speed, hence it is called constant power stage. At high speeds, the voltage capability of the inverter is the primary limiting factor for the output torque. The maximum torque is inversely proportional to the square of the speed. It is referred to as the voltage limit stage.

In a typical electric vehicle, the traction battery voltage will be dependent upon the state of charge of the traction battery. Typically, a traction battery at higher states of charge, i.e. a freshly charged traction battery, will exhibit a higher traction battery voltage. Likewise, a traction battery at lower states of charge, i.e. a depleted traction battery, will exhibit a lower traction battery voltage.

In an electric vehicle drivetrain, the maximum amount of torque and/or power that the electric motor can produce and deliver to the drivetrain varies based on the state of the charge of the traction battery, and more specifically on the traction battery voltage. A higher traction battery voltage will produce a larger maximum torque and/or power for the electric motor at speeds above a base speed.

Without a control system, the electric vehicle exhibits acceleration and power capability based upon the state of charge of the traction battery, which changes as the state of charge changes. The result is that the vehicle may appear to "over-perform" with a battery at higher states of charge and "under-perform" with a battery at lower states of charge. The result is inconsistent performance of the electric vehicle.

Additionally, in a typical electric vehicle, the transaxle and other mechanical assemblies of the drivetrain connected to the motor are typically designed based on maximum torque and/or power ratings. Based on the selection and characteristics of the motor and traction battery, the maximum torque and/or power which can be generated by the motor may exceed the designed torque and power ratings of the transaxle or other mechanical assemblies. Without a method of controlling this situation, it is possible that the motor and traction battery may be selected in such a manner so as to cause damage to the transaxle or other mechanical assemblies, which may subsequently lead to a shortened life span for the mechanical assemblies.

SUMMARY OF THE INVENTION

It is an object of the present invention to provide a method for operating an induction motor within predefined limits. It is another object of the present invention to impose the limits based on the selection of an electric vehicle traction battery. It is yet another object of the present invention to impose limits based on mechanical characteristics of the electric vehicle's drivetrain.

It is a further object of the present invention to provide a control method which limits the torque and/or power output of an electric motor to predefined maximum values. It is still a further object of the present invention to control both the motor torque and power as a function of traction battery charge.

In carrying out the above objects and other objects and features of the present invention, a method is provided that estimates the motor output torque using equations that are based on the real torque current command, the magnetic field and known constants. To protect an electric vehicle from excessive motor torque and power the method of the present invention assures that the output power is less than a maximum power and the output torque is less than a maximum torque at all times. A clamping value is applied to the driver's desired torque current.

The method of the present invention is used with an induction motor and the command values are determined using a Field Orientation Principle (FOP), that is known in the art, in conjunction with other known control principles such as a Space Vector Modulation (SVM) and pulse width modulated control (PWM).

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
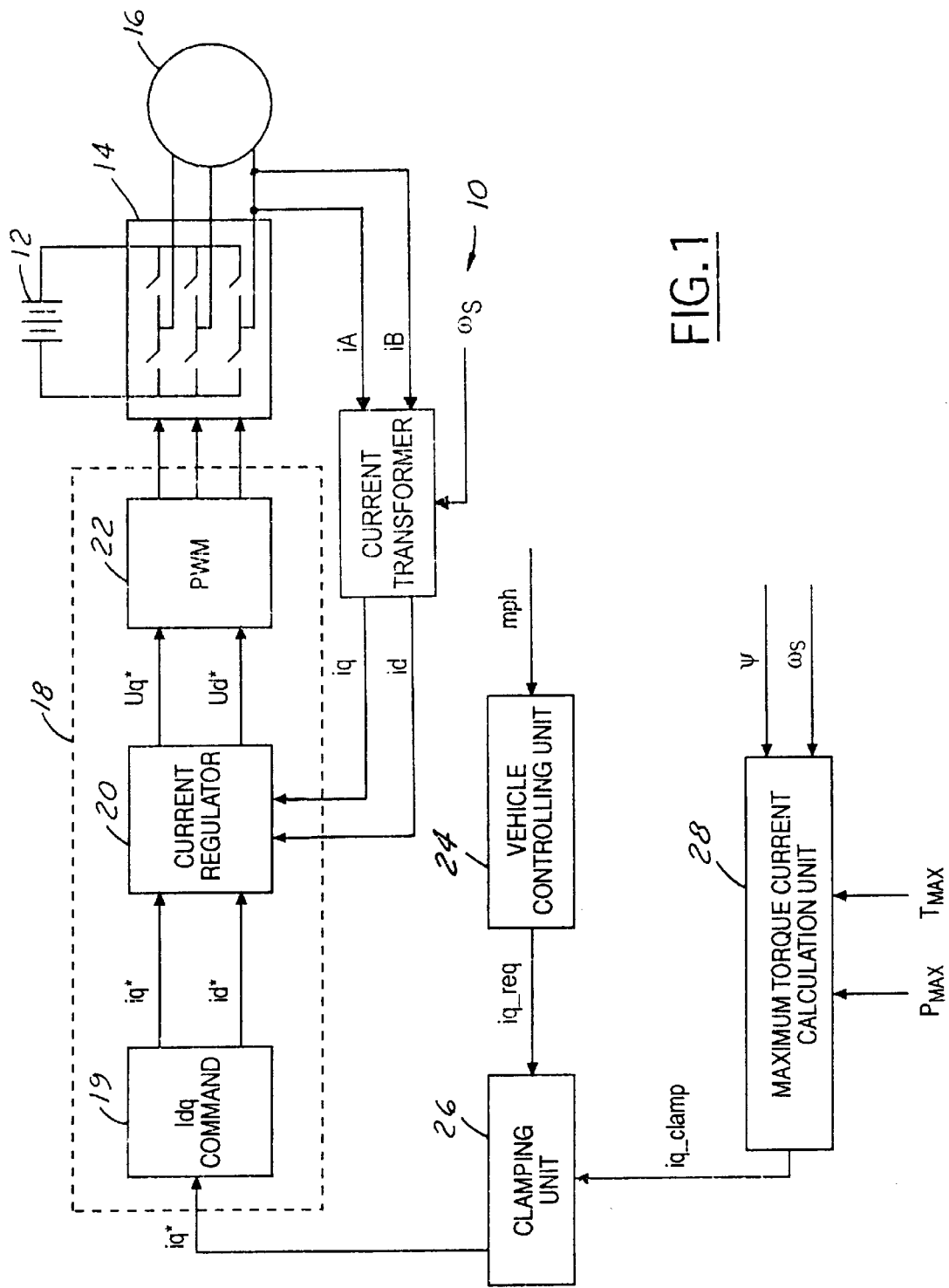
FIG. 1 is a block diagram of the method of the present invention as it is applied to an induction motor and motor control system.

FIG. 1 shows an electric vehicle drive system 10 including a power supply 12, which is a traction battery. The battery 12 is applied to an inverter 14 and to an induction motor 16. A driver controller 18 controls the voltage and current applied to the motor 16, which drives the wheels of an electric vehicle (not shown) throughout a range of operating conditions. Preferably, the controls in the controller 18 rely upon software. However, it is to be understood that hardware and other types of controls can be used to practice the present invention.

The controller 18 utilizes current regulation 19 realized in a synchronous frame rotating with a rotor flux frame. Two current components are controlled by a current regulator 20. The current components include the torque component current, also referred to as the q axis current, $i_q^*$, and the magnetizing current, also referred to as the d axis current, $i_d^*$. Two output variables from the controller 18 are the torque component of the motor voltage, $u_q^*$, and the magnetizing component of the motor voltage, $U_d^*$. These commands are transformed and used as input variables into an algorithm of a pulse width modulated section 22.

Field orientation control as applied to induction motors is similar to separately excited DC motors stators and rotors except that there is no separate winding for flux current and no terminals are available to detect the rotor currents. Accordingly, coordinate control of the magnitude, frequency, and phases of stator current is used to realize separate flux and torque control of the induction motor.

Using the field orientation principle for induction motor control, the motor voltage vector amplitude $u_p^*$ and the voltage vector angle $\alpha_u$ are decided using the following equations:

$$u_d^* = R_s^* i_d^* - \omega_s^* L_\sigma^* i_q^*$$

$$U_q^* = R_s^* i_q^* + \omega_s^* L_\sigma^* i_d^* + \omega_s^* \Psi^*$$

$$u_p^* = [(U_d^*)^2 + (U_q^*)^2]^{1/2}$$

$$\alpha_u = \int \omega_s^* dt + tg^{-1}(u_q^*/u_d^*)$$

where $i_q^*$ is the real torque current command, $i_d^*$ is the magnetizing current command, and $\Psi^*$, is the magnetic field. The magnetizing current, $i_d^*$, is derived from $i_q^*$ using a peak torque per amps principle, which is known by one of ordinary skill in the art and will not be discussed herein. The magnetic field, $\Psi^*$ is calculated using $i_d^*$ and other motor parameters.

In addition, $R_s$ is the stator resistance, $L\sigma$ is the leakage inductance, and $\omega_s$ is the stator frequency.

By applying the space vector modulation for pulse width modulation control, the real system feedback $\Psi$, $i_q$, and $i_d$ will follow the command signal $\Psi^*$, $i_q^*$, and $i_d^*$, respectively as long as the motor voltage vector amplitude, $u_p^*$ satisfies the constraint;

$$u_p^* < k_{bat}^* U_{bat},$$

where $K_{bat}$ is a constant and $U_{bat}$ is the battery voltage.

Under the constraint, the real torque current command will approach the real system feedback torque current, $i_q \approx i_q^*$, the magnetizing current command will approach the real system magnetizing current, $i_d \approx i_d^*$, and the real system magnetic field will approach the command magnetic field, $\Psi \approx \Psi^*$. Both the motor torque and motor power are controllable because the motor output torque and power can be estimated using the following equations:

$$T_{out} = k_{trq}^* \Psi^* i_q$$

$$P_{out} = k_{pwr}^* \omega_s^* \Psi^* i_q,$$

where $k_{trq}$ and $k_{pwr}$ are constants. It is clear that a freshly charged battery having a higher voltage $U_{bat}$ will output higher torque and power because a higher $u_p$ will be allowed.

In order to protect an electric vehicle from excessive motor torque and power, it is assured that the output power is less than a predetermined maximum, $P_{out} < P_{max}$, and the output torque is less than a predetermined maximum, $T_{out} < T_{max}$, in all cases. This is accomplished according to the present invention by applying a clamping algorithm to current required by the driver's demands. The real torque current command, $i_q^*$, is derived from the torque current demand, $i_{q\_req}$, which is derived from the driver's inputs using controls such as the throttle, brake pedal, and gear selector from a vehicle controlling unit 24. A clamping algorithm is applied to $i_{q\_req}$ to derive $i_d^*$. Before the clamping algorithm is applied, $i_q^*$ is equal to $i_{q\_req}$. A clamping unit 26 applies the algorithm to $i_{q\_req}$ such that:

$$i_q^* < iq\_clamp = \min\{P_{max}/(k_{pwr}^* \omega_s^* \Psi), T_{max}/(k_{trq}^* \Psi)\}$$

According to the method of the present invention, it is guaranteed that the motor torque and power will never exceed maximum setpoint values, $T_{max}$ and $P_{max}$, respectively. The clamping value, iq_clamp is calculated in a maximum torque current calculation unit 28 using inputs that include $P_{max}$, $T_{max}$, the magnetic field, and the stator frequency. iq_clamp is applied to the clamping unit 26 to determine the real torque current command, $i_q^*$, which is output from the clamping unit 26 and, by design, always satisfies the condition that $i_q^* \leq iq\_clamp$.

The invention covers all alternatives, modifications, and equivalents, as may be included within the spirit and scope of the appended claims.

What is claimed is:

1. A method for maintaining consistent performance in an electric vehicle having a driver controller for controlling a real torque current command, said method comprising the steps of:
   calculating a clamping value;
   applying said clamping value to the real torque current command such that said real torque current command is always less than said clamping value.

2. The method as set forth in claim 1 wherein said step of calculating a clamping value further comprises calculating said clamping value based on a predetermined maximum power setting and a predetermined maximum torque setting.

3. The method as set forth in claim 2 further comprising the step of controlling a power output and a torque output to always be less than said predetermined maximum power setting and said predetermined maximum torque setting by estimating said power output and said torque output using the equations:

$$P_{out} = k_{pwr}^* \omega_s^* \Psi^* i_q$$

$$T_{out} = k_{trq}^* \Psi^* i_q.$$

4. A clamping unit for an induction motor controlling unit having a driver controller for controlling a real torque current command, said clamping unit comprising:
   logic for calculating a clamping value based on a predetermined maximum power setting and a predetermined maximum torque setting for said induction motor; and
   logic for applying said clamping value to the real torque current command such that said torque current command does not exceed said clamping value.

5. An electrical vehicle traction drive control comprising:
   an induction motor;
   a battery supply;
   an inverter control including a current regulator for controlling a real torque current command; and a clamping unit for calculating a clamping value based on said predetermined maximum power setting and said predetermined maximum torque setting, said clamping value being applied to the real torque current command such that said real torque current command is always less than or equal to said clamping value.

* * * * *